Oct. 4, 1966
M. SAPOFF ETAL
3,276,262
LONG OPERATING HYPSOMETER STRUCTURE
Filed July 21, 1964
2 Sheets-Sheet 1
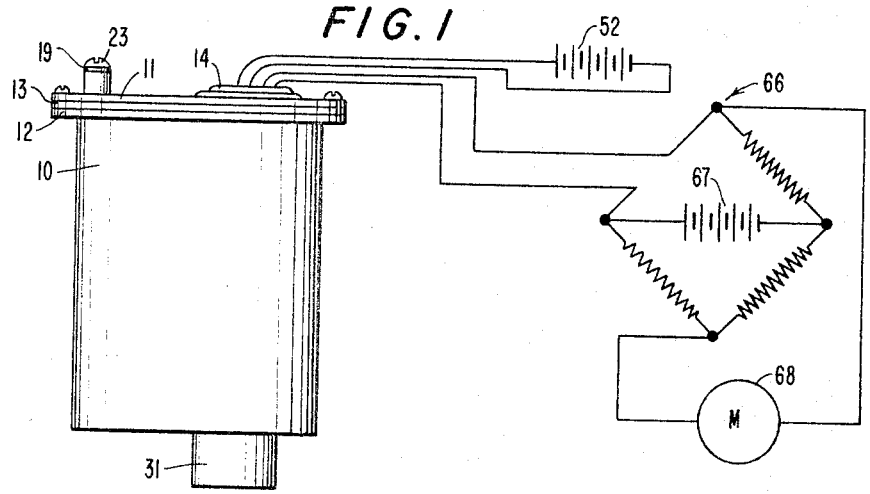
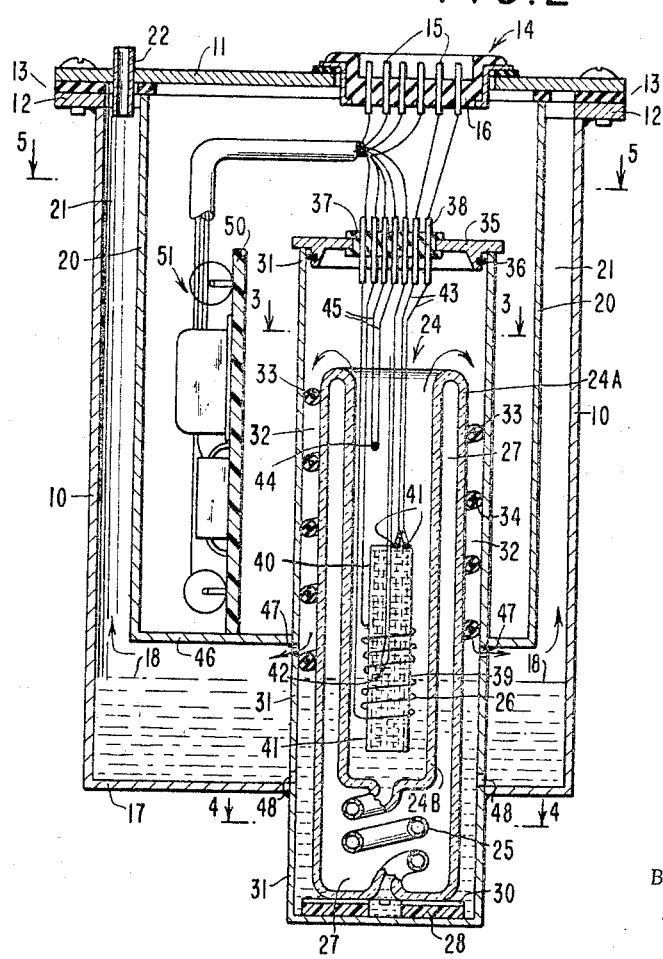
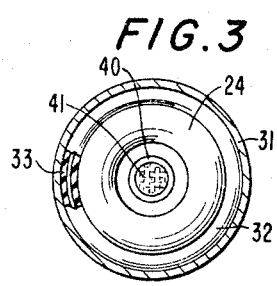
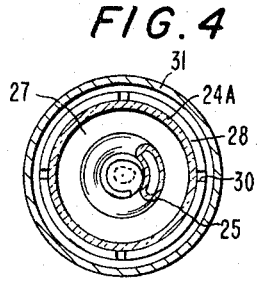
INVENTORS.
MEYER SAPOFF
JOHN GECSEY
BY WALTER C. WAGNER
Albert F. Kronman
ATTORNEY Oct. 4, 1966  M. SAPOFF ETAL  3,276,262
LONG OPERATING HYPSOMETER STRUCTURE
Filed July 21, 1964
2 Sheets-Sheet 2
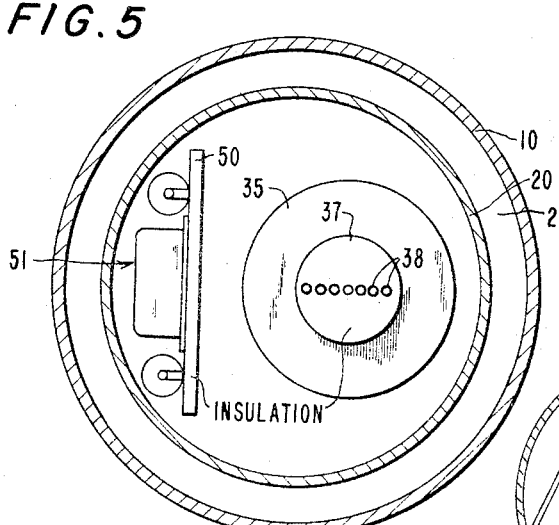
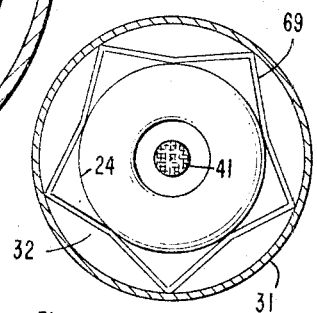
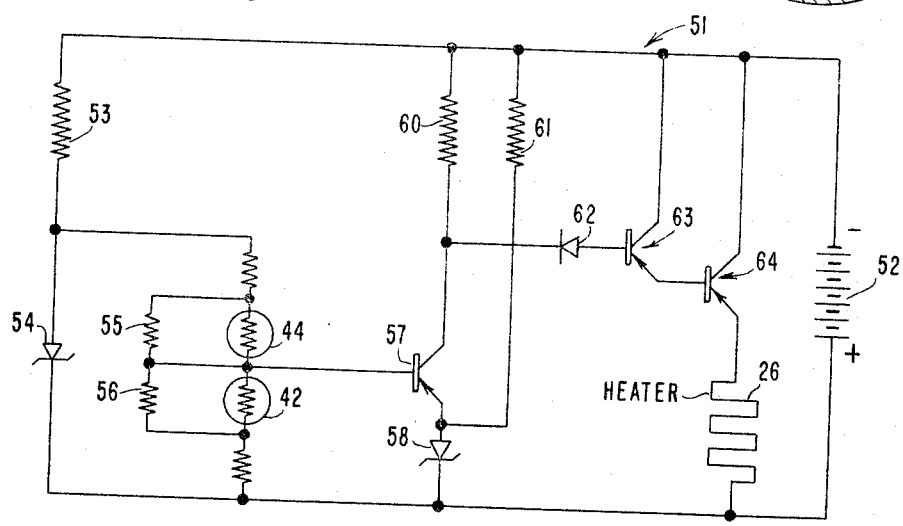
FIG. 7
LEGEND
 THERMISTOR
 DIODE RECTIFIER
 ZENER DIODE
 PNP TRANSISTOR
INVENTORS.
MEYER SAPOFF
JOHN GECSEY
WALTER C. WAGNER
BY Albert F. Kronman
ATTORNEY United States Patent Office 3,276,262
Patented Oct. 4, 1966

3,276,262
LONG OPERATING HYPSOMETER STRUCTURE
Meyer Sapoff, West Orange, and John Gecsey, Rahway, N.J., and Walter C. Wagner, Lexington, Mass., assignors to Victory Engineering Corporation, Springfield, N.J., a corporation of New Jersey
Filed July 21, 1964, Ser. No. 384,208
11 Claims. (Cl. 73—384)

This invention relates to a pressure measuring device for measuring atmospheric pressures. It has particular reference to a hypsometer in which the liquid is heated to a boiling temperature and the vapor resulting from this action is condensed within the instrument and returned to a reservoir for continued use.

Hypsometers are well known in the art and have been used for some time to measure the pressure of the atmosphere in weather observation, airplanes, and rockets. One of the disadvantages of the known types of hypsometers is that the liquid within the instrument boils off and escapes to the atmosphere. For this reason the instrument's operational life is limited. The present invention solves this difficulty by providing a long condensation path within the instrument itself so that most of the vapor is condensed and is returned to a reservoir for repeated use. The invention also includes a novel control circuit which adjusts an electrical current through a heater coil so that the rate of boiling is adjusted to a relatively constant amount regardless of the ambient pressure or temperature.

An object of the present invention is to provide an improved hypsometer which avoides one or more of the disadvantages and limitations of prior art instruments.

Another object of the present invention is to increase the accuracy of hypsometers by regulating the rate of boiling.

A still further object of the present invention is to reduce the power required by the heating coil which boils the liquid within the instrument.

Another object of the present invention is to provide a longer operating time for each liquid filling.

An object of the present invention is to increase the range of pressures which may be determined by the instrument.

A further object of the present invention is to provide a long path for the vapor between the position where the liquid is boiled and the connection to the outside atmosphere so that the rate of heat loss and consequently, the power required for boiling the liquid is reduced to the minimum amount required. Because of these adjustments most of the vapor condenses within the instrument and is returned to a reservoir.

The invention includes a pressuring measuring device having an evacuated double walled cylindrical container which is open at its upper end. A supply of liquid to be boiled is in the container and a conduit connects the lower part of the container to a large reservoir. The liquid is boiled by a heater and a temperature-responsive element is positioned at the surface of the boiling liquid for determining the boiling temperature. The container is surrounded by a cylindrical jacket for condensing the vapor and for returning it to the reservoir.

A feature of the present invention includes a pair of temperature-responsive elements which cooperate with a control circuit to adjust the heater current.

Another feature of the present invention is a second jacket enclosing a second annular space which is also used for condensation of the vapor.

A further feature of the present invention includes a helix positioned within one of the annular spaces surrounding the container for increasing the length of travel of the vapor so that it may condense more readily, and not carry heat away from the container as readily.

The invention consists of the construction, combination and arrangement of parts, as herein illustrated, described and claimed.

In the accompanying drawings, forming a part hereof there is illustrated one form of embodiment of the invention, in which drawings similar reference characters designate corresponding parts, and in which:

FIGURE 1 is a side view of the hypsometer showing connections to a measuring circuit and a source of potential.

FIGURE 2 is a cross-sectional view of the hypsometer taken along a vertical plane.

FIGURE 3 is a cross-sectional view of a portion of the hypsometer taken along line 3—3 of FIGURE 2.

FIGURE 4 is another cross-sectional view of the instrument and is taken along line 4—4 of FIGURE 2.

FIGURE 5 is a cross-sectional view of the entire instrument and is taken along line 5—5 of FIGURE 2.

FIGURE 6 is a circuit diagram of connections of the control circuit which adjusts the heater current.

FIGURE 7 is a legend indicating the characteristics of certain portions of the circuit shown in FIGURE 6.

FIGURE 8 is a view similar to FIGURE 3 showing a further embodiment.

Referring now to the drawings, the instrument is contained within a cylindrical shell 10 which is closed on top by means of a flat lid 11 bolted to a flange 12 and separated by a resilient washer 13. Electrical connections to the inside of the instrument are made by means of a multiple pronged plug socket 14 secured to the lid 11. This socket contains the usual conducting inserts 15 secured to an insulator disk 16.

The outer jacket 10 is closed at its bottom portion by a flat plate 17, thereby forming a reservoir for the storage of a liquid 18. This liquid may be water or any other liquid whose boiling point varies considerably with the ambient pressure. Within the outer jacket is another cylindrical metal container 20 which is in axial alignment with the outer cylinder and which defines an annular space 21 which aids in the condensation of the vapor. Near the edge of the lid 11, a small tube 22 is positioned for connecting the inside of the instrument to the outside atmosphere. When the instrument is in use, this tube must be kept open, but when the instrument is in storage, a small screw 23 (FIGURE 1) in conjunction with a resilient gasket 19 may be used to close this tube and prevent evaporation of the liquid.

The liquid 18 is boiled within a double walled container 24 having an outer wall 24A and an inner wall 24B which holds the liquid to be boiled. These walls are joined at their upper ends as illustrated and are connected at their lower portions by a tubular helix 25. This helix is inserted between the two walls to provide a long path between the liquid and the reservoir, and to keep the heat produced by a helical wire 26 from transferring to the liquid in the reservoir. The two walls 24A and 24B define an annular space 27 which is evacuated, thereby forming a type of Dewar container which resists the transfer of heat from the inner walls to the outside walls. The inside walls may be silvered. The bottom of container 24 rests on a Teflon washer 28 having a plurality of radial slots 30. These slots are to permit the liquid in the reservoir to move into the helix 25 and maintain a desired level in the container 24.

Container 24 is mounted within a tubular jacket 31 which is in axial alignment with container 24 but separated from its outer wall by a short distance. The separation defines an annular space 32 which may be left open from the top of the container 24 to the top level of the liquid in the reservoir. However, in order to increase the path of the vapor from the inside of the container 24 down to the reservoir, a helix 33 is wound in the annular space. The helix may be of any suitable material but it has been found by experiment that a Teflon tube can be adjusted more easily. In order to increase the stability of the helix, a stainless steel or brass wire 34 is positioned within the Teflon tube to hold it in place. The Teflon tube is selected so as to fill the space completely under a slight resilient deformation so that the vapor from the inside of container 24 is forced into a helical path in its downward movement. The top end of jacket 31 is closed by cover 35 which may be equipped with an O ring 36 to hermetically seal this portion of the jacket. Other sealing means such as soldering or welding may be used. Cover 35 may be made of metal but a portion of this cover contains a disc-shaped insulator 37 which supports at least six conductive inserts 38 for connecting the heater and other circuit components to prongs 15 and a control circuit.

A wick 40 is mounted within tube 24B to maintain a supply of liquid around temperature measuring thermistors 41. One thermistor is sufficient but two are generally supplied. These thermistors are connected to the measuring bridge 66 and furnish the information from which the pressure is calculated. On the outside of the wick the heater resistance wire 26 is wound, this helix aiding in supporting the wick and for maintaining it in its central position. The wick is always wetted by the liquid 18 from the reservoir even though the height of the top surface of the liquid may vary a small amount. Conductive leads 43 are connected to thermistors 41 and are brought out through the cover 35 and plug socket 14.

There are times when considerable power must be supplied to the heater wire to retain an even flow of vapor from the liquid. There may be other times when the heater current is much less to retain vapor equilibrium. In order to adjust the heater current automatically, two additional thermistor units 42, 44 are employed. One control thermistor 42 is mounted with the wick, near its central portion and somewhat removed from the sensing thermistors 41. A second control thermistor 44 is mounted above the wick to measure the temperature of the vapor after it has left the upper surface of the wick. These control thermistors are connected by lead-in conductors through inserts 38 in insulator 37. The control circuit and its method of adjusting the heater current will be described later.

The outer jacket 31 which holds the glass container has its lower portion welded to bottom disc 17 of cylinder 10. A similar disc-like member 46 is welded to jacket 31 as illustrated in FIGURE 2. Disc 46 is a part of the second jacket 20. In order to permit the vapor to be in contact with the atmosphere, a series of holes 47 is cut in jacket 31 just below the junction point of the jacket and disc 46. Another series of holes 48 is cut in the jacket just above the junction point of the jacket and lower disc 17. These latter holes permit the liquid 18 to move from the reservoir into the space between the jacket 31 and compartment 24 and to move downwardly outside the container and up through helix 25 into the inside chamber.

From the above description it will be evident that as the liquid is boiled from the wick structure 40, it passes upwardly through the wick, making contact with element 42, and then passing up and around the top of container 24 where the vapor makes contact with thermistor 44, then through the helical spaces 32 defined by the Teflon tube 33, through holes 47 to the space above liquid 18, and, if the vapor has not condensed by this time, it moves upwardly into the annular space 21 where substantially all of it is condensed on the inner wall of cylinder 10 and outer wall of cylinder 20.

Container 24 and its supporting jacket 31 have been positioned slightly off center from cylinders 10 and 20 so that an insulating panel 50 may be installed in the space as indicated (FIGURES 2 and 5). Circuit components 51 are secured to this panel and form part of the control circuit which regulates the heater current. This circuit will be described below.

The control circuit is shown in FIGURE 6 and comprises a direct current source of potential 52, the heater element 26, both temperature-responsive elements 42 and 44 and other control elements which will now be described. A resistor 53 and a Zener diode 54 form a voltage divider which is bridged across the terminals of battery 52. The two temperature-responsive elements 42 and 44 are connected in series across the Zener diode 54 which provides them with a definite controlled voltage. These two elements have negative temperature coefficients of resistivity and are matched in thermal characteristics. However, resistors 55 and 56 are connected in parallel across these elements, as shown, to aid in a precise match and to limit the variations in resistance to predetermined resistance values.

A first sensing transistor 57 is connected with its base in contact with the junction point between the two elements 42 and 44. The emitter of transistor 57 is connected through a second Zener diode 58 to the positive terminal of the battery while the collector electrode is connected in series with a resistor 60 to the negative terminal. The emitter is also connected in series with a resistor 61 to the negative terminal. Resistor 61 and Zener diode 58 form a second voltage divider which applies a regulated voltage to the emitter of transistor 57. The collector is connected through a diode rectifier 62 to the base electrode of a second transistor 63 and the emitter of this transistor is connected to the base of a power transistor 64. This power transistor carries the heater current through the heater wire 26. Both collectors of transistors 63 and 64 are connected directly to the negative terminal of battery 52.

The operation of this control circuit is as follows: when the hypsometer is first put into operation, both control elements 42 and 44 are at the same temperature. The two networks are designed so that the voltage across the first Zener diode 54 is higher than that of the second Zener diode 58. These bias voltages make transistor 57 conducting and its collector-emitter resistance is a minimum. This condition results in a maximum current through resistor 60 and a minimum current through transistor 64 and heater wire 26. The result is a minimum amount of heat generated around wick 41. However, this small amount of power is enough to raise the tempertaure of the liquid and also to raise the temperature of element 42. This action lowers the resistance of element 42 while having little or no effect on element 44. The potential of the junction of these two elements (and the base of transistor 57) is increased and the emitter-collector current is reduced. As a result, the current through transistor 64 and heater 26 is increased to produce a greater rise in temperature of the wick, the liquid, and element 42.

As long as the temperature of the upper element 44 is not affected, the above described action continues until the heater current is a maximum and the liquid is brought to its boiling point a maximum rate. The rising vapor, however, soon increases the temperature of the upper element 44 and the voltage of the base of transistor 57 is adjusted to be closer to its initial value. This action reduces the heater current and a thermal-voltage balance is soon reached where the heater current is just sufficient to maintain a small temperature difference between the two elements.

The action of the control circuit is such that the difference in temperature between the two elements 42, 44 is nearly constant. When the outside temperature is lowered, more heater power is required and the loss of heat through conduction to the outer shell increases the temperature gradient. The increased power tends to reduce the temperature gradient. The power increases until the equilibrium temperature difference is established which is approximately the same for all conditions of ambient temperature variations. When the ambient pressure is lowered, the boiling point of the liquid is lowered, thereby lowering the temperatures of both control elements and their temperature difference. This action lowers the heater current which, in turn, tends to increase their difference and return it to its original value.

The temperature of the boiling liquid can be measured in many ways, some hypsometers actually using a mercury in glass thermometer for this purpose. One of the most direct methods of measuring this temperature involves the use of a temperature-responsive resistance 39 which is shown (FIGURE 1) connected to a Wheatstone bridge 66. Three of the bridge arms are resistors while the fourth is the element 39. Two opposite bridge junctions are connected to a source of electric power 67 while the other junctions are connected to a meter 68. Any of the well known methods of using such a bridge may be employed to determine the resistance of element 39, its corresponding temperature, and the ambient pressure.

From the above description it will be evident that the two element combination compensates for the variations in pressure and for change in ambient temperature.

Many modifications can be made in the construction of the apparatus without departing from the scope of the invention. The helical Teflon coil 33 may be replaced by fluted ribs 69 arranged in a number of ways (see FIGURE 8). The Teflon support washer 28 may be made in a number of configurations and parts of the control circuit may be positioned outside the main support container 10. The tubular helix 25 may also be a straight capillary tube.

Having thus fully described the invention, what is claimed as new and desired to be secured by Letters Patent of the United States, is:

1. A pressure measuring device comprising, a double-walled cylindrical container open at its upper end to the ambient pressure to be measured, a supply of liquid in the container, a reservoir containing the liquid surrounding the lower portion of the container, a conduit connecting the reservoir and the container adjacent their lower portions for the transfer of liquid, a heater in intimate contact with the liquid in the container for heating the liquid to its boiling point, a wick within the container adjacent to the heater and in contact with the liquid, a temperature-responsive element adjacent to the wick, and circuit means including said element for measuring the temperature of the boiling point, said container surrounded by a cylindrical jacket means at its top for condensing the vapor produced by the boiling liquid and for returning it to the reservoir through the annular space between the jacket and the container and means to connect the jacket to ambient pressure.

2. A pressure measuring device as claimed in claim 1, wherein a second jacket is positioned outside the first jacket and adjacent to a cylindrical shell which forms the outside wall of the instrument, said jacket and shell forming a second annular space for the condensation of vapor.

3. A pressure measuring device as claimed in claim 2, wherein a helix of non-absorptive material is disposed within said annular space and in resilient contact with both the jacket and the container for lengthening the vapor path between said container and the reservoir.

4. A pressure measuring device as claimed in claim 2, wherein the space between said walls of the double-walled container is evacuated to provide greater heat insulation.

5. A pressure measuring device as claimed in claim 4, wherein the evacuated space is further protected by a reflecting metallic coating on both of said walls.

6. A pressure measuring device comprising, a double-walled cylindrical container open at its upper end to the ambient pressure to be measured, a supply of liquid in the container, a reservoir containing the liquid surrounding the lower portion of the container, a conduit connecting the reservoir and the container adjacent to their lower portions for the transfer of the liquid, an electrical heater in intimate contact with the liquid in the container for heating the liquid to its boiling point, a first temperature-responsive element adjacent to the upper level of the liquid in the container, and a circuit means including said first element for measuring the temperature of the boiling liquid, a second temperature-responsive element also adjacent to the upper level of the liquid, a third temperature-responsive element spaced above the second element for thermal contact by the vapor produced by the boiling liquid, and a control circuit for adjusting the current through the heater responsive to the difference in resistance between the second and third elements, said control circuit including a direct current amplifier.

7. A pressure measuring device as claimed in claim 6, wherein lead-in conductors from the heater and from perature difference between the second and third elements is increased.

8. A pressure measuring device as claimed in claim 6, wherein said conduit between the container and the reservoir is in the form of a helix.

9. A pressure measuring device as claimed in claim 6, wherein lead-in conductors from the heater and from the three temperature-responsive elements are connected through a hermetically sealed cover of a jacket which supports the double-walled container.

10. A pressure measuring device as claimed in claim 6, wherein said double-walled cylindrical container is resiliently supported within the jacket by a plurality of fluted metal sheets for providing greater condensing surface area between the container and the liquid reservoir.

11. A pressure measuring device comprising, a double-walled cylindrical container open at its upper end to the ambient pressure to be measured, a supply of liquid in the container, a reservoir containing the liquid surrounding the lower portion of the container, a conduit connecting the reservoir and the container adjacent to their lower portions for the transfer of the liquid, an electrical heater in intimate contact with the liquid in the container for heating the liquid to its boiling point, a first temperature-responsive element adjacent to the upper level of the liquid in the container, and a circuit means including said first element for measuring the temperature of the boiling liquid, a second temperature-responsive element also adjacent to the upper level of the liquid, a third temperature-responsive element spaced above the second element for thermal contact by the vapor produced by the boiling liquid, and a control circuit for adjusting the current through the heater responsive to the difference in resistance between the second and third elements.

References Cited by the Examiner

UNITED STATES PATENTS 2,677,279   5/1954   Rich _____ 73—384

LOUIS R. PRINCE, *Primary Examiner.*